United States Patent
Yamazaki

(10) Patent No.: US 6,961,343 B1
(45) Date of Patent: Nov. 1, 2005

(54) CROSS-CONNECTION SWITCH

(75) Inventor: Naomi Yamazaki, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/411,917

(22) Filed: Oct. 4, 1999

(30) Foreign Application Priority Data

Oct. 30, 1998 (JP) .................. 10-309309

(51) Int. Cl.[7] ............................ H04B 7/212

(52) U.S. Cl. .................. 370/442; 370/363; 370/352

(58) Field of Search ............... 370/389, 360, 370/263, 365, 366, 368, 369, 371, 372, 374, 370/375, 376, 377, 378, 379, 382, 383, 363, 370/381, 492, 442, 352

(56) References Cited

U.S. PATENT DOCUMENTS

| | | | | |
|---|---|---|---|---|
| 4,206,322 A | * | 6/1980 | Lurtz .................. | 370/358 |
| 4,841,522 A | * | 6/1989 | Yamazaki .................. | 370/368 |
| 5,353,281 A | * | 10/1994 | Kuwahara et al. .......... | 370/378 |
| 5,905,725 A | * | 5/1999 | Sindhu et al. ............. | 370/389 |
| 5,991,265 A | * | 11/1999 | Lincoln .................. | 370/236.1 |
| 6,021,135 A | * | 2/2000 | Ishihara et al. ............. | 370/474 |
| 6,347,089 B1 | * | 2/2002 | Tsui et al. .................. | 370/425 |

FOREIGN PATENT DOCUMENTS

| | | |
|---|---|---|
| JP | 52-55404 | 6/1977 |
| JP | 1-146446 | 6/1989 |
| JP | 3-201837 | 9/1991 |
| JP | 3-253199 | 11/1991 |
| JP | 4-37336 | 2/1992 |
| JP | 4-138800 | 5/1992 |
| JP | 4-332297 | 11/1992 |
| JP | 5-61752 | 3/1993 |
| JP | 5-304686 | 11/1993 |
| JP | 5-344087 | 12/1993 |
| JP | 7-038929 | 2/1995 |
| JP | 7-135673 | 5/1995 |
| JP | 9-74397 | 3/1997 |

* cited by examiner

*Primary Examiner*—Duc Ho
*Assistant Examiner*—Thien D. Tran
(74) *Attorney, Agent, or Firm*—Katten Muchin Rosenman LLP

(57) ABSTRACT

An input data (input frame) is sequentially stored in memory in time slot units. A counter counts the number of input pulses of a clock synchronous with the time slot of the input frame, outputs the count value as a write address to the memory, and outputs it as a read address to the memory. A processor in a cross-connection device preliminarily writes to the memory data indicating switching information of a time slot. The memory outputs the data stored at an address input from the counter as a read address to the memory. The memory outputs data of a time slot of an input frame stored at the address as time slot data of an output frame.

7 Claims, 14 Drawing Sheets

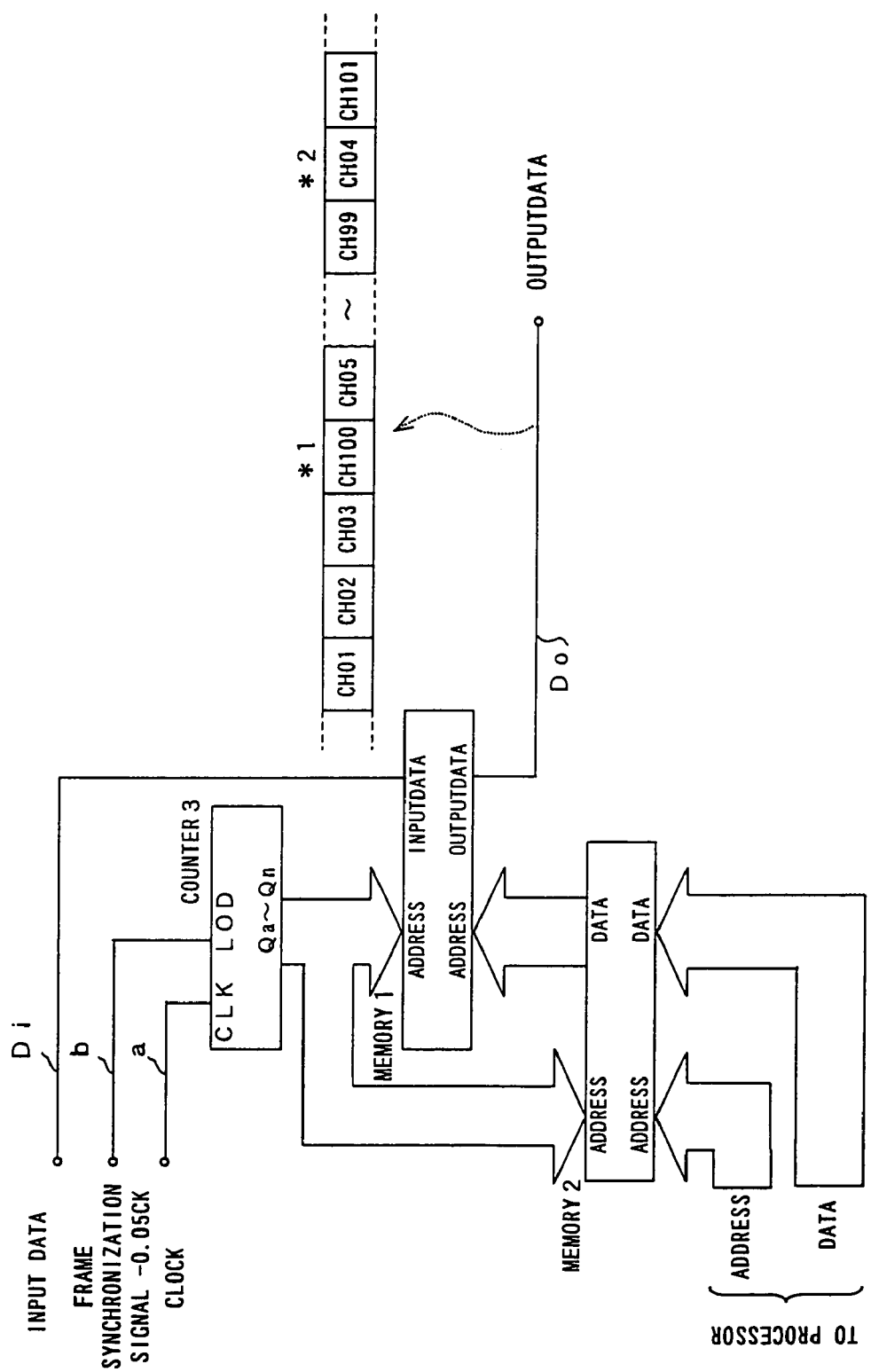
F I G. 2

2

| ADDRESS | DATA | |
|---|---|---|
| TIME SLOT INFORMATION | CH DATA INFORMATION | |
| 0 0 0 0 | 0 0 0 0 | |
| 0 0 0 1 | 0 0 0 1 | |
| 0 0 0 2 | 0 0 0 2 | |
| 0 0 0 3 | 0 0 0 3 | |
| 0 0 0 4 | 0 1 0 0 | ∗1 |
| 0 0 0 5 | 0 0 0 5 | |
| ∫ | ∫ | |
| 0 0 9 9 | 0 0 9 9 | |
| 0 1 0 0 | 0 0 0 4 | ∗2 |
| 0 1 0 1 | 0 1 0 1 | |

| ADDRESS | | DATA |
|---|---|---|
| CH NUMBER | TIME SLOT NUMBER | TIME SLOT DATA |
| — | 0000 | 0000 |
| 01 | 0001 | 0001 |
| | 0002 | 0002 |
| ⌇ | ⌇ | ⌇ |
| | 000n | 000n |
| 02 | 000n+1 | 000n+1 |
| ⌇ | ⌇ | ⌇ |
| | 000n+n | 000n+n |
| ⌇ | ⌇ | ⌇ |

F I G. 5

12

| ADDRESS | DATA | |
|---|---|---|
| TIME SLOT INFORMATION | (CH DATA INFORMATION) | (LINE INFORMATION) |
| 0000 | 0000 | 00 |
| 0001 | 0001 | 00 |
| 0002 | 0002 | 00 |
| 0003 | 0050 | 03 *3 |
| 0004 | 0100 | 00 |
| 0005 | 0005 | 00 |
| ⋮ | ⋮ | ⋮ |
| 0099 | 0100 | 07 *4 |
| 0100 | 0004 | 00 |
| 0101 | 0101 | 00 |

FIG. 7

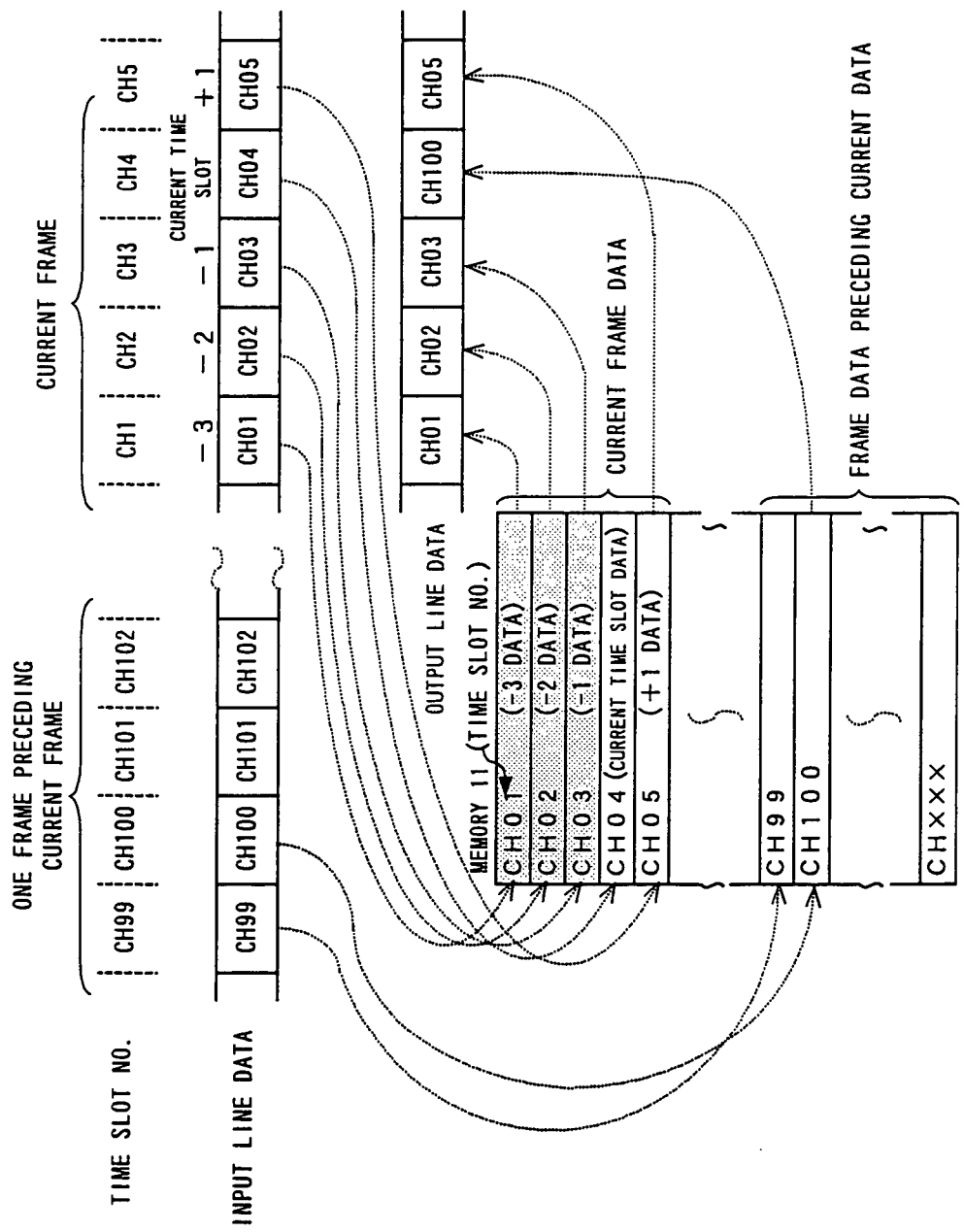
F I G. 8

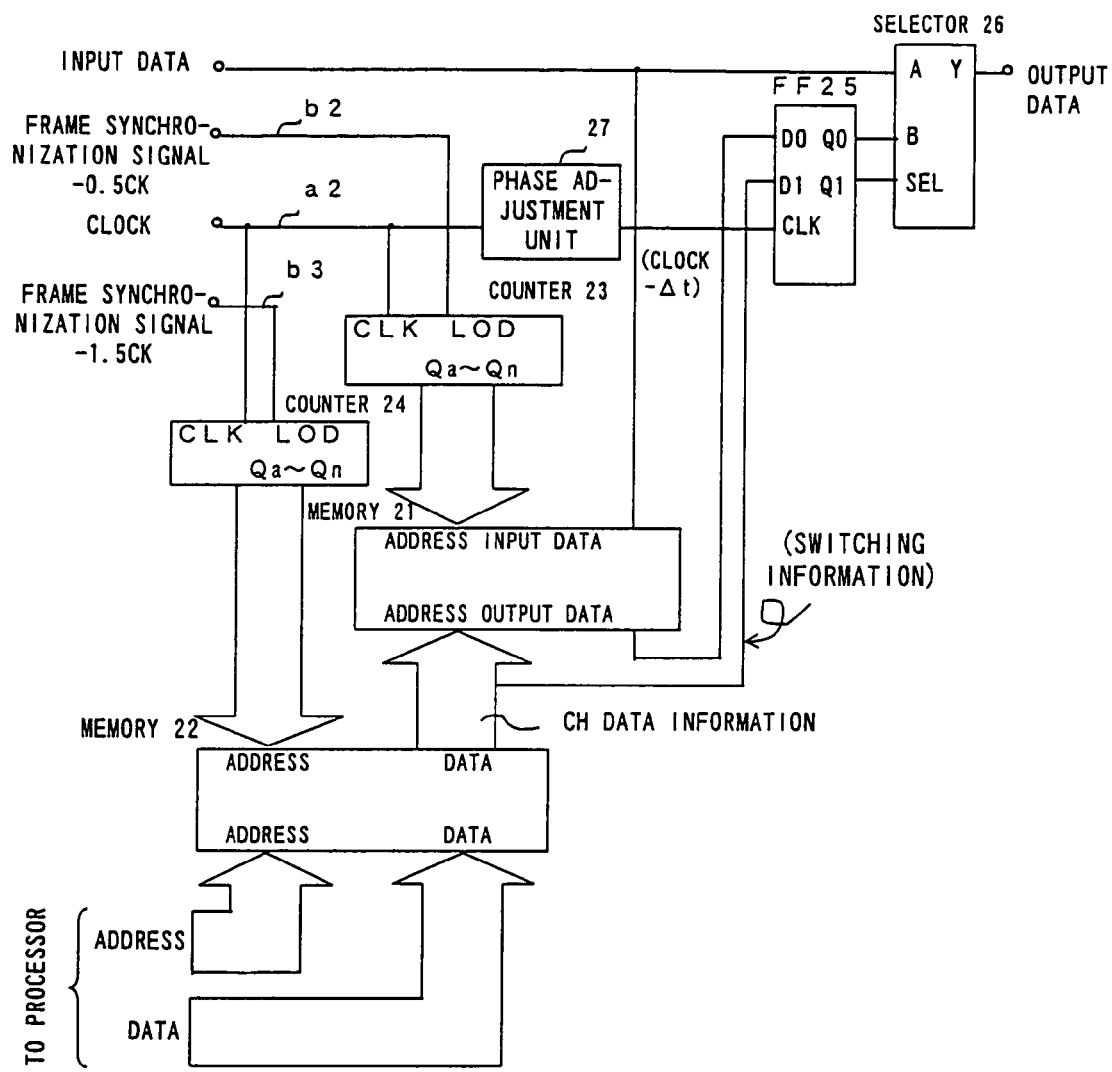
F I G. 9

2 2

| ADDRESS | DATA | |
|---|---|---|
| TIME SLOT INFORMATION | (CH DATA INFORMATION) | SWITCHING INFORMATION |
| 0 0 0 0 | 0 0 0 0 | 0 |
| 0 0 0 1 | 0 0 0 1 | 0 |
| 0 0 0 2 | 0 0 0 2 | 0 |
| 0 0 0 3 | 0 0 0 3 | 0 |
| 0 0 0 4 | 0 1 0 0 | 1 | *1
| 0 0 0 5 | 0 0 0 5 | 0 |
| ∫ | ∫ | ∫ |
| 0 0 9 9 | 0 0 9 9 | 0 |
| 0 1 0 0 | 0 0 0 4 | 1 | *2
| 0 1 0 1 | 0 1 0 1 | 0 |

F I G. 1 0

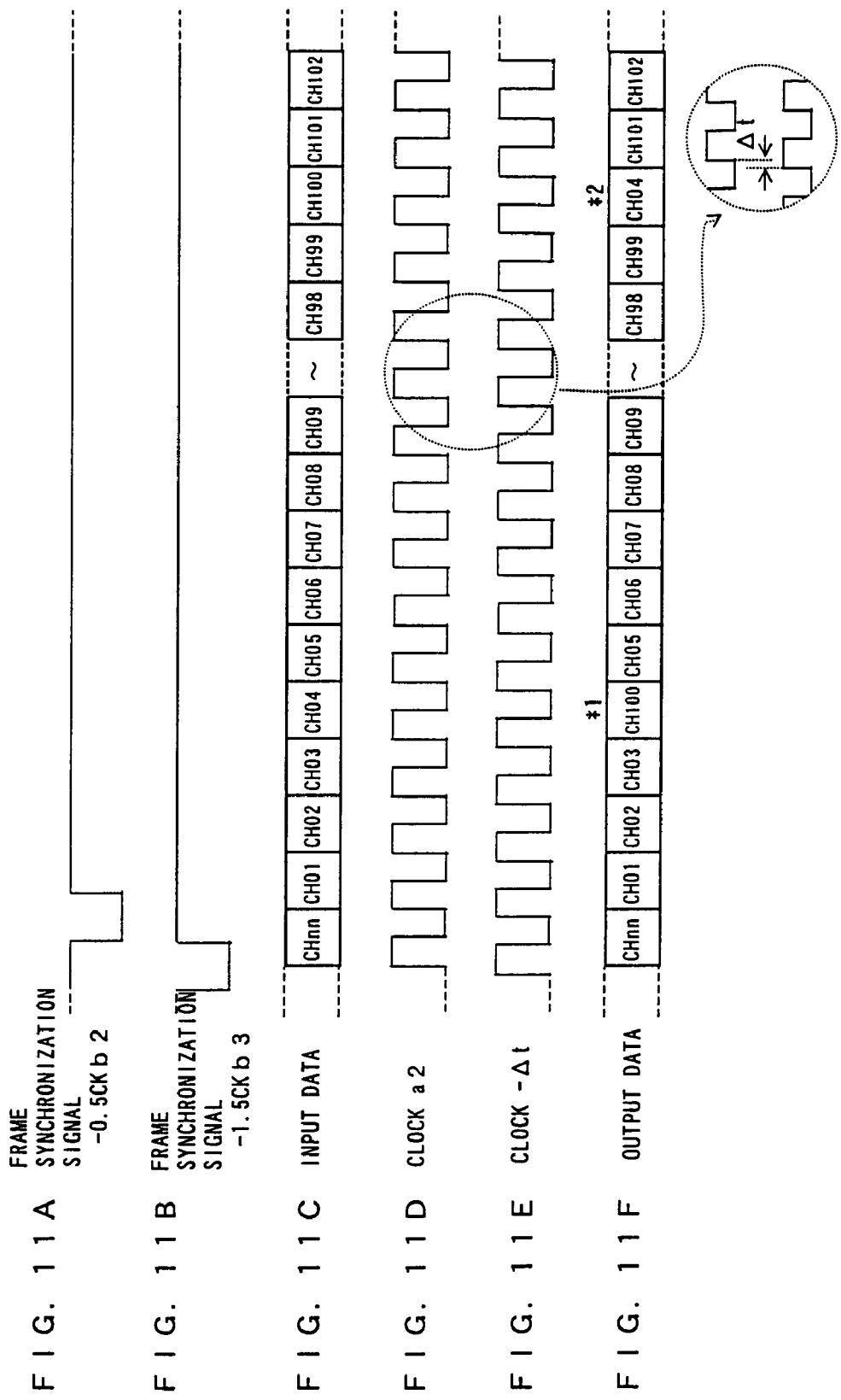

32

| ADDRESS | DATA | | | |
|---|---|---|---|---|
| TIME SLOT INFORMATON | CH DATA INFORMATION | LINE INFORMATION | SWITCHING INFORMATION | |
| 0 0 0 0 | 0 0 0 0 | 0 0 | 0 | |
| 0 0 0 1 | 0 0 0 1 | 0 0 | 0 | |
| 0 0 0 2 | 0 0 0 2 | 0 0 | 0 | |
| 0 0 0 3 | 0 0 5 0 | 0 3 | 1 | ✳ 3 |
| 0 0 0 4 | 0 1 0 0 | 0 0 | 1 | ✳ 1 |
| 0 0 0 5 | 0 0 0 5 | 0 0 | 0 | |
| ～ | ～ | ～ | ～ | |
| 0 0 9 9 | 0 1 0 0 | 0 7 | 1 | ✳ 4 |
| 0 1 0 0 | 0 0 0 4 | 0 0 | 1 | ✳ 2 |
| 0 1 0 1 | 0 1 0 1 | 0 0 | 0 | |

F I G. 1 3

CROSS-CONNECTION SWITCH

BACKGROUND OF THE INVENTION

1. Field of the Invention

The present invention relates to a cross-connection switch for use in a cross-connection device capable of switching a destination for each channel in a network including a circuit in which a plurality of channels are multiplexed in the transmission of a digital signal.

2. Description of the Related Art

Recently, data transmitted through a transmission line are not only voice data but also multimedia information such as an image data, etc., thereby requiring a high-speed and large-capacity network. In this case, it is desired to have an exchange or a cross-connection device capable of accommodating the largest possible number of lines to perform a high-speed switching process.

FIG. 1 shows the configuration of a switch unit (cross-connection switch) for switching in time and space a frame signal in channel units in the conventional cross-connection device.

In FIG. 1, the cross-connection switch receives data (frames) through input lines 1 through 4, cross-connects the data (switching the data to respective destinations in channel units), and outputs the cross-connected data (frames) to the input lines 1 through 4. In this example, the cross-connection switch is provided with unit switches 149-1 through 149-4 for the corresponding output lines. Each of the switches receives signals (frames) of the input lines 1 through 4, cross-connects the input signals (input frames), and outputs the cross-connected signals (output frames) to the input lines 1 through 4. Since the unit switches 149-2 through 149-4 have the same configuration as the unit switch 149-1, their internal configurations are omitted here. Also in FIG. 1, the number of accommodated lines is 4, but the configuration of the cross-connection switch is not limited to this configuration, and can be modified depending on the number of cross-connected lines.

A serial signal input through the input lines 1 through 4 is converted into a parallel signal of n bits (n is a positive integer) by serial-parallel converters 155 through 158. The serial-parallel conversion is performed for each channel of an input signal (input data) in one frame. In the serial-parallel converters 155 through 158, an input signal converted into a parallel signal is stored in memory 150 through 153. Parallel signals are stored in channel units. That is, a parallel signal of each channel is stored at one address.

An address read control unit 154 provides a read address 170 of a parallel signal for the memory 150 through 153 at an instruction from the control unit (not shown in the figure) of a cross-connection device. When the read address 170 is input, the parallel signal on each channel output from the memory 150 through 153 is input to a 4-1 selector 159. The address read control unit 154 applies a selection signal SEL to the 4-1 selector 159 such that a parallel signal output from any of the memory 150 through 153 can be switched and output for each channel. Thus, the parallel signal on each channel of each frame input from the input lines 1 through 4 is exchanged in time and space, and output to a parallel-serial converter 160. The parallel signal on each channel is converted into a serial signal by the parallel-serial converter 160 for each channel, synchronized with each time slot of an output frame, and output to an output line 1.

Similarly, each of the other unit switches 149-2 through 149-4 outputs an output frame to output lines 2 through 4.

As described above, the conventional cross-connect device performs a cross-connecting process after converting a signal on one channel assigned to a time slot of each frame input in series into a parallel signal.

That is, in the conventional configuration shown in FIG. 1, a frame of multiplexed signal on one channel is designed in n-bit units (n is a positive integer), and is switched in time division manner in n-bit units.

Since a signal in the input lines 1 through 4 is serial-parallel converted, there arises an n clock+0.5 clock delay (for a process in the opposition phase to keep a margin) until n-bit parallel data (data on one channel) is prepared before starting the switching process. One clock in this process refers to a clock synchronous with a 1-bit signal in an input frame. That is, to make a signal transmitted in series through the input lines 1 through 4 into an n-bit parallel signal, it is necessary to input the n-bit signal to the serial-parallel converters 155 through 158, thereby generating an n-clock delay. In addition, to correctly latch the value of a serial signal, the serial-parallel converters 155 through 158 should latch it in the middle of a 1-bit signal. To attain this, the serial-parallel converters 155 through 158 perform a process in the opposition phase of the clock to keep a margin. Therefore, each bit of signal is latched according to a phase-adjusted clock with the phase of the clock shifted by 0.5 clock from the input signal. As a result, a further 0.5-clock delay is generated.

Since the parallel-serial conversion is performed after the switching process and the result is output through the line, the 0.5 clock delay arises again (to perform the process in the in-phase to reserve a margin for the data processed in the opposition phase as described above). Accordingly, a delay time of at least (n clock+1 clock) arises before the line signal input to the unit switches 149-1 through 149-4 is output to the output lines 1 through 4.

In addition, with the configuration shown in FIG. 1, the switching process is performed after converting the serial data (serial signal) into parallel data (parallel signal). Therefore, the number of physical memory units and the number of selectors and other necessary lines for switching signals are required corresponding to the accumulated number of bits or lines depending on the number of bits written to the memory (number of bits on one channel) and the number of lines to be simultaneously cross-connected. As a result, the hardware functioning as a cross-connection switch is considerably large.

As described above, with the configuration of the conventional cross-connection switch, a serial signal is first converted into a parallel signal, and then a switching process is performed. Therefore, there has been the problem that a signal transmission delay arises depending on the number of bit on channels to perform the processes by the serial-parallel converter and a parallel-serial converter.

Furthermore, since a serial signal is converted into a parallel signal in the conventional technology, the number of physical memory units and the number of circuits such as selectors for switching a parallel signal become large, thereby resulting in a large hardware. Accordingly, with a larger storage capacity for communications of these days, it is a problem to realize a small cross-connection device with a large capacity.

SUMMARY OF THE INVENTION

The present invention aims at providing a cross-connection switch capable of reducing the signal transmission delay between an input line and an output line and realizing a small cross-connection device with a large storage capacity.

The cross-connection switch according to the present invention includes a first memory unit for storing data of switching information of a time slot at an address assigned time slot information; a second memory unit for storing each piece of time slot data of an input frame in time slot units, inputting data stored in the first memory unit, and outputting the data stored at the address specified by the data as time slot data of an output frame; and a counter unit for counting the number of inputs of time slots of an input frame, and outputting the count values as a read address and a write address to the first memory unit and the second memory unit.

According to the present invention, since the cross-connection can be realized without converting serial data into parallel data, the hardware can be small, and the power consumption can be reduced. Furthermore, the delay generated by converting serial data into parallel data, and then reconverting the parallel data into serial data. Therefore, even when a cross-connection device has a large capacity, it can be small, the power consumption can be reduced, and the switching process can be performed at a high speed.

BRIEF DESCRIPTION OF THE DRAWINGS

FIG. 2 is a block diagram of the configuration of the cross-connection according to the first embodiment of the present invention;

FIG. 3 shows an example of the contents stored in the memory 2;

FIG. 5 shows an example of the data structure in the memory 2a according to the second embodiment of the present invention which has the circuit configuration shown in FIG. 2, and switches and connects the channel of a frame in which one channel is multiplexed in n bit units;

FIG. 7 shows the data configuration in the memory for realizing the above described switch and connection;

FIG. 8 shows the switching operation according to the third embodiment shown in FIG. 6;

FIG. 9 is a block diagram of the configuration of the cross-connection according to the fourth embodiment of the present invention in which the delay of the input data and output data is reduced to substantially 0;

FIG. 10 shows an example of data stored in the memory 21;

FIGS. 11A through 11F are time charts for describing the operations according to the fourth embodiment of the present invention;

FIG. 13 shows an example of data input to the memory 32; and

DESCRIPTION OF THE PREFERRED EMBODIMENTS

Figure 1:
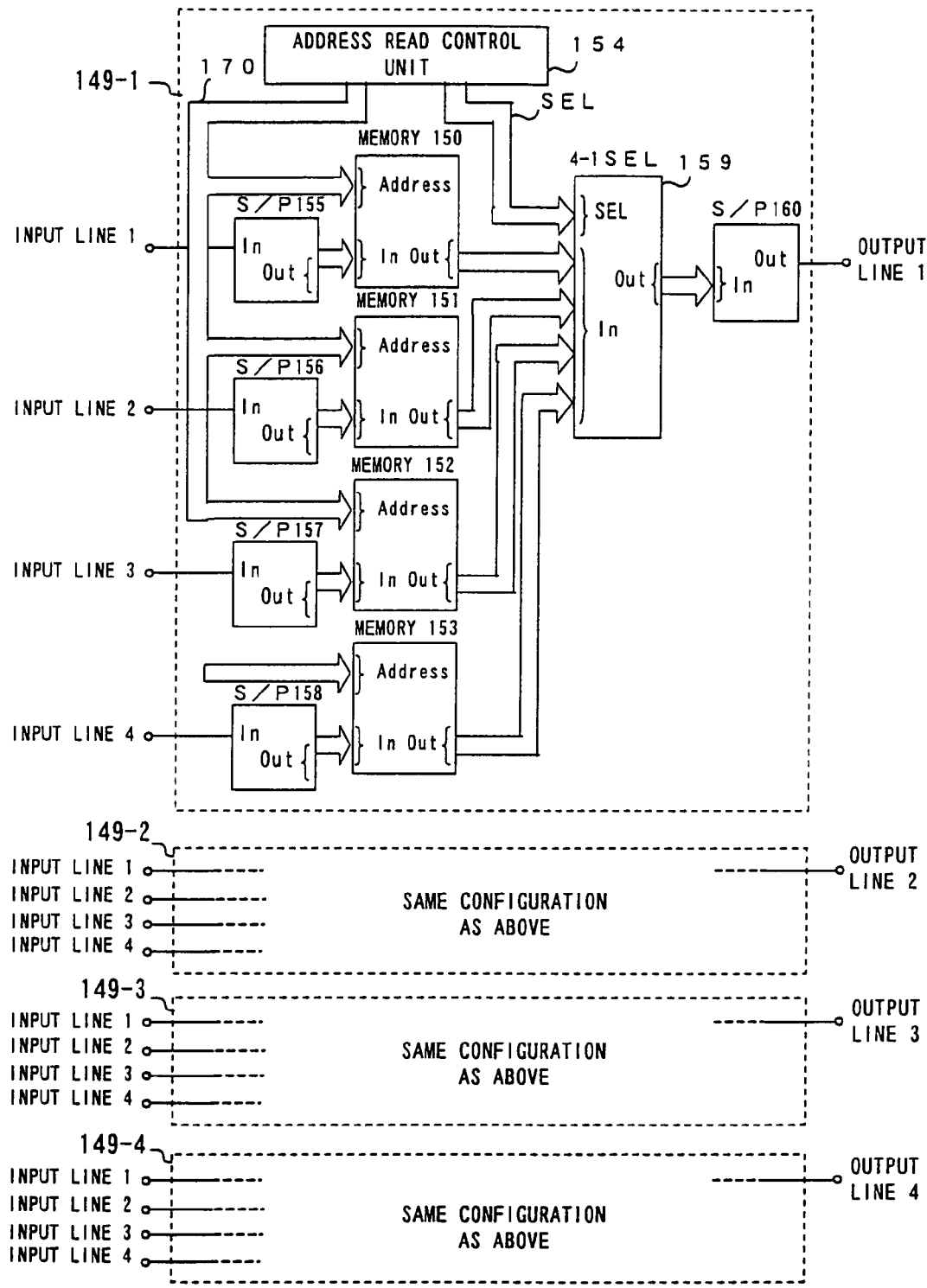
FIG. 1 shows the configuration of the switch unit (cross-connection switch) for switching a frame signal in time and space in channel units according to the conventional cross-connection device.

FIG. 2 is a block diagram of the configuration of the cross-connection according to the first embodiment of the present invention.

According to the first embodiment of the present invention, input data Di is input to the input port terminal of the memory 1, and data $D_o$ output from the output port terminal is output as the resultant data after the switching process. Furthermore, the memory 1 can be, for example, a dual port memory.

In this embodiment, a clock synchronous with the time slot of a frame signal in the input line is used as a clock a to be input to a counter 3 shown in FIG. 2. A frame synchronous signal (−0.5 CK: a frame synchronous pulse signal 0.5 phase (half cycle) clock in advance relative to the head of the input frame signal) b is used as a load signal of the counter 3.

In addition, the output from the counter 3 is input to the address input terminals of the memory 1 and the memory 2, and is used as time slot information of the input data stored in the memory 1 and the output data stored in the memory 2.

That is, the data of a channel 1 is written to the memory 1 at the time slot frame-synchronous according to the frame synchronous signal (−0.5 CK)b. The number of a channel to be switched to the time slot is read as the control information about the time slot from the memory 2. (For example, when the data '0100' indicating the channel number 100 is written in advance at the address 0001 in the memory 2 by the processor (not shown in the attached drawings), the data '0100 is read from the memory 2, if the address 0004 is input from the counter 3 to the memory 2, and is provided as a read address signal for the memory 1. The processor not shown in the attached drawings is a common processor for setting and controlling a path for a cross-connection device.)

When channel data of each time slot is switched according to the present embodiment, the data between channels can be switched (time slot conversion) by writing the channel data number (channel number) to be switched to a time slot as data at the address in the memory 2 indicating the number of the time slot (time slot information) to be switched by the processor.

FIG. 3 shows an example of the contents stored in the memory 2.

The memory 2 contains entries of information about data of which channel in an input frame is to be inserted to which time slot of an output frame. The entry information is rewritten each time the processor not shown in the attached drawings changes the way of switching channel data. Each address in the memory 2 corresponds to the information about the data of each time slot of an input frame written in the memory 1, that is, the time slot position information (time slot number) of the data of each time slot. At each address of the memory 2, channel data information indicating channel data inserted to a time slot having the same value as a corresponding address in the memory 2 is written. For example, the channel data written at the address 0001 in the memory 2 is '0001', and indicates that channel data is not switched in the time slot 0001. The channel data '0100' is written at the address 0004 in the memory 2, and indicates that the data in the channel 100 of an input frame is to be inserted to the time slot having the number 0004 of the output frame. Similarly, the channel data '0004' is written to the address 0100 in the memory 2, and indicates that the data in the channel 4 of an input frame is to be inserted to the time slot of the number 0100 of the output frame.

Thus, the information about the channel data to be inserted into each time slot in the frame in output data $D_o$ is written to the memory 2. Therefore, data can be switched between channels (time slots) of an input frame and an output frame by inputting the data stored in the memory 2 as a read address signal to the memory 1.

Figure 4:
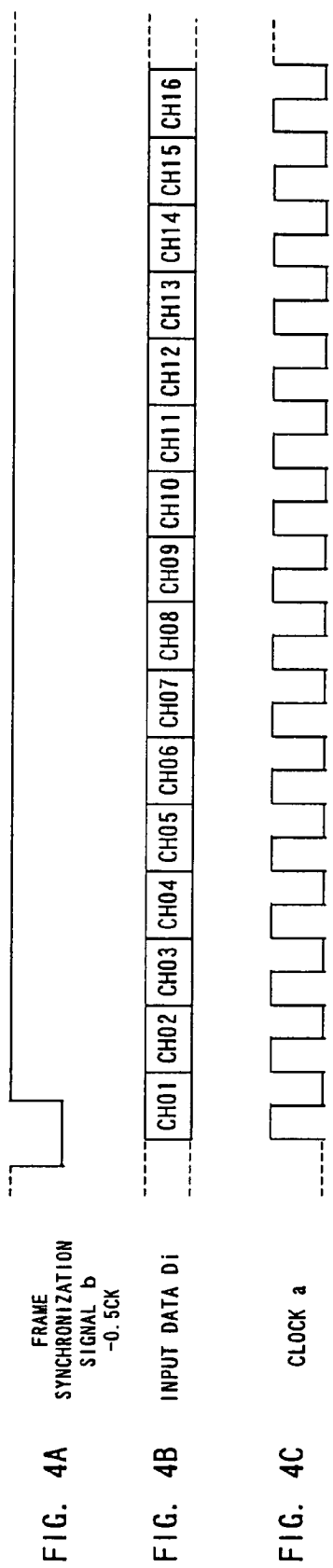
FIGS. 4A through 4C are timing charts of the operations of the cross-connection switch according to the first embodiment shown in FIG. 2.

FIG. 4 is a timing chart of the operation of the cross-connection switch according to the first embodiment shown in FIG. 2.

The operation of the cross-connection switch shown in FIG. 2 is described below by referring to FIGS. 2 through 4.

The frame synchronization signal (−0.5 CK) shown in FIG. 4A is input to the load terminal (LOD) of the counter 3. Then, at the rise of the pulse of the clock a shown in FIG. 4C, the initial value 0001 is loaded onto the counter 3 (frame synchronization). Upon receipt of the clock a in synchronization with each time slot of each frame in the input data $D_i$ shown in FIG. 4B, the counter 3 counts the number of input pulses of the clock a. Since the clock a generates one pulse for one time slot of the frame in the input data $D_i$, the counter 3 sequentially counts the numbers of the time slots from 0001 each time a new frame is input to the memory 1 by counting the number of input pulses of the clock a after the frame synchronization. The count value obtained by the counter 3 is input to the memory 1 and the memory 2 shown in FIG. 2 as an address signal. That is, the value is provided for the memory 1 as the number of each channel (time slot) of the frame in the input data $D_i$, and as an address at which the data of each channel (time slot) is to be stored. The value is also provided for the memory 2 as a time slot number (time slot information) of the frame in the output data $D_o$.

The processor writes the channel data information as shown in FIG. 3 at each address in the memory 2. Therefore, when the count value is input from the counter 3 to the memory 2 as a read address signal, the memory 2 outputs to the memory 1 the channel data information (channel number) stored at the address equal to the count value as a read address signal. When the read address signal is input from the memory 2, the memory 1 outputs the channel data of the input frame stored at the address. In the above described operation, the time slot number of each channel data of the frame in the input data $D_i$ stored in the memory 1 is equal to the storage address. The channel data information output from the memory 2 is the number the time slot of the channel data of the input frame to be read, and is also the storage address of the channel data of the input frame to be read. Therefore, finally, the channel data of each time slot of the frame (output frame) in the output data $D_o$ is sequentially output in order of time slot number from the memory 1. In FIG. 3, as indicated by *1 and *2, the channel data at 0100 and 0004 are switched in the frame in the input data $D_i$ (input frame) and the frame in the output data $D_o$ (output frame) by writing the numbers of the channel data to be switched to the addresses 0004 and 0100.

FIG. 5 shows another example of the data configuration in the memory 2 (hereinafter referred to as memory 2a) according to the second environment of the present invention which has the circuit configuration shown in FIG. 2 and in which channel data, each channel being multiplexed in n-bit units, is switched and connected.

In the case of a signal multiplexed in n bit units for one channel as in the above described conventional example, a serial-parallel converter and a parallel-serial converter required in the above described conventional cross-connection switch are not required by mapping the addresses of the memory 2a in n bit units, that is, in channel units, in series from the channel 1 as shown in FIG. 5. In addition, the number of the required memory units and circuits can be minimized. In the memory 2a shown in FIG. 5, n addresses continuously input from the counter 3 correspond to n bits (n time slot numbers) of one channel. Furthermore, corresponding to the address mapping, the n bit time slot data indicating the data of n bit time slots of a channel of an input frame to be inserted into n bit time slots of each channel in the output data $D_o$ is stored in n addresses in the memory 2a. When a cross-connection is realized according to the second embodiment, the data of all time slots belonging to one channel of a frame (input frame) in the input data $D_i$ is inserted into all time slots belonging to another channel, to which the data is switched to, of a frame (output frame) in the output data $D_o$.

The operation performed when channel data is switched between the channel number 4 and the channel number 100 using the memory 2a is described below by referring to FIGS. 2 through 4C.

In FIG. 2, the processor stores the data (time slot data) to be switched among the channel data in the format as shown in FIG. 5 in the memory 2a. At the rise of the pulse of the clock a after inputting a frame synchronization signal (−0.5 CK) b, the initial value of 0001 is loaded, and the data of each channel of an input frame is written to the memory 1 based on the count value of the counter 3 at which the process of counting the number of input pulses of the clock a is started. Although not shown in FIG. 5, when the channel 4 and the channel 100 are switched to each other, the time slot number of each piece of data of n bits of the channel 100 in each input frame is entered at the address equal to the time slot number of each data of n bits of the channel 4 (the fourth channel) in the input frame (output frame) in the memory 2a. While each piece of data (n-bit data) of n time slots of the channel 4 in the current input frame is input to the memory 1, the time slot number of each piece of data of n bits of the channel 100 is provided as a data read address for the memory from the memory 2, and each piece of n-bit data of the channel 100 in the input frame one frame before the current frame is output from the memory 2.

Figure 6:
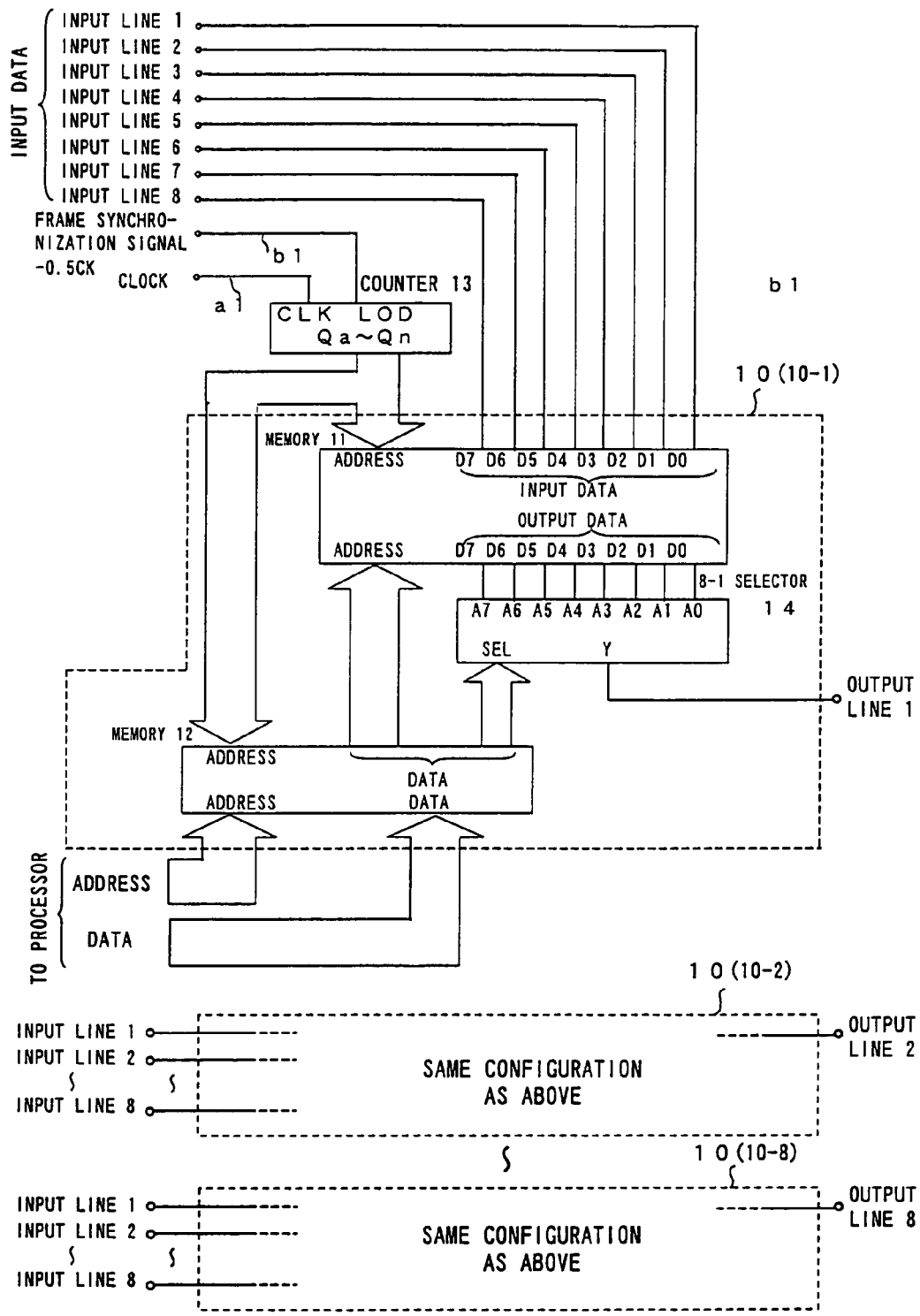
FIG. 6 is a block diagram of the configuration of the cross-connection switch according to the third embodiment of the present invention.

FIG. 6 is a block diagram of the configuration of the cross-connection switch according to the third embodiment of the present invention.

For example, when a switching process is performed among 8 lines as shown in FIG. 6, one line can comprise only memory 11, memory 12, and an 8-1 selector 14 as indicated by the unit switch 10-1 enclosed by broken lines in FIG. 6. Therefore, the entire cross-connection switch can comprise only one counter 13 and 24 units (3 units×8 lines).

The delay of the switching process by the configuration according to the present embodiment can be ignored depending on the line frequency because a high-speed memory of 1 or 2 nanosecond access time has been produced.

In addition, when a line frequency is high and causes a serious delay, the configuration according to the fourth and fifth embodiments described later can minimize the signal transmission delay time, thereby realizing a high speed switching process on channel and line in time and space.

FIG. 6 shows the configuration capable of performing a switching process. In FIG. 6, data in any line can be selected from among the data in input lines 1 through 8 and output to any of output lines 1 through 8 using the 8-1 selector 14 by adding line information to the information set in the memory 2 and using the resultant information as a selection signal of the 8-1 selector 14.

FIG. 7 shows the data configuration of the memory 12 in the unit switch 10-1 for the above described switch and connection.

As shown in FIG. 7, when the channel data of the time slot at the number 0050 of the input line 4 is switched to the time slot at the number 0003 of the output line 1, the channel data information of 0050 and the line information of 03 are set at the address 0003 of the memory 12 as indicated by *3 shown in FIG. 7. When the channel data of the time slot at the number 0100 of the input line 8 is switched to the time slot at the number 0099 of the output line 1, the channel data information of 0100 and the line information of 07 are set at the address 0099 of the memory 12 as indicated by *4 shown in FIG. 7.

In FIG. 6, one unit switch 10 encompassed by broken lines is designed to accommodate 8 lines, and eight unit switches 10 form the important part of a cross-connection switch. The input data from the input lines 1 through 8 is input to the memory 11 of each of the unit switches 10-1 through 10-8, and, as with the above described frame synchronization signal b, a frame synchronization signal b1 whose phase is 0.5 clock faster than the head of the input frame is input to the counter 13. Also, the clock a1 is input to the counter 13, and, as with the counter 3, the counter 13 starts counting the input pulses of the clock a1 at the rise of the pulse of the clock a1 after the input of the frame synchronization signal b1. The clock a1 is synchronous with each time slot of the input data, and generates one pulse each time one time slot is input. Therefore, the number (address) of the time slot of an input frame can be specified by the count value of the counter 13 by counting the number of input pulses of the clock a1 after inputting the frame synchronization signal b1. The count value is input to the memory 11 as a storage address of the channel data of each time slot of an input frame. Furthermore, the count value is input as a read address to the memory 12. As shown in FIG. 7, the data for channel data switch and connection comprising the channel data information and the line information written by the processor is stored in the memory 12 at the address equal to the value of the time slot information indicating the positional information of a time slot for the switch and connection. By outputting to the memory 12 the count value (time slot number information of the output frame) output from the counter 13 as a read address, the channel data information of the channel data of an input frame to be inserted to the time slot having the time slot number of the output frame and the line information are read, and input to the address input terminal of the memory 11 and the selection terminal (SEL) of the 8-1 selector 14 respectively. The channel data information output from the memory 12 is input as a read address to the memory 11. Since the data of each time slot of input data (each of the input frames input from the input lines 1 through 8) is stored in the input order, the above described channel data information indicates the time slot number of the input data. Therefore, by inputting the above described channel data information as a read address, the memory 11 outputs to the output ports 00 through 08 the data of time slots of 8 bits (each channel data of the input lines 1 through 8 of 8 bits) stored at the read address in each of the channel data of each input frame input from the input lines 1 through 8 stored in the memory 11. The 8-bit time slot data is input to the data input terminals A0 through A8 of the 8-1 selector 14. As described above, line information is input as a selector signal SEL from the memory 12 to the 8-1 selector 14. According to the value of the line information, any data input to the input terminals A0 through A7 is selected and output. For example, when the line information is read from the address 0003 of the memory 12 shown in FIG. 7, the 8-1 selector 14 outputs to the output terminal Y the time slot data (channel data) of the input line 4 input to the input terminal A3 because the value of the line information is set to 03.

FIG. 8 shows the switching operation according to the third embodiment shown in FIG. 6.

Time slot data (channel data) of the input lines 1 through 8 are input to the memory 11 in time series, and sequentially stored from the time slot number 0001. That is, each time the time slot data is input from the input lines 1 through 8, it is written in series from the time slot number 0001 sequentially at the address 0001. When the next frame data is input, the time slot data in the previous frame is overwritten. Therefore, the memory 11 may contain the time slot data in the frame written one frame before the current frame but not yet over-written to the memory 12, and simultaneously the time slot data in the current frame. FIG. 8 shows the storage of the frame data in the memory 11. As described above, each time slot data in the frame is serially written in order of time slot number starting at the address 0001 of the memory 11. Therefore, the data having a smaller time slot number is the time slot data in the frame being written at present, and the data having a larger time slot number is the time slot data in the frame written one frame before the current frame. The time slot data stored in the memory 11 is read sequential from the data having a smaller time slot number (channel number) when the switching process is not performed. FIG. 8 shows the state in which the time slot data of the channel 5 (time slot number 5) in the output frame data (output line data) have been output.

In this case, the information that the switching process of inserting the data of the channel 100 of the input frame into the time slot of the channel (time slot number) 4 of the output frame is to be performed is entered in the memory 12 at the address 0004 shown in FIG. 7. Therefore, the data (time slot data having time slot number 100) of the channel 100 in the frame stored one frame before the current frame in the memory 11 is read from the memory 11, and the data is output from the 8-1 selector 14 when the data of the time slot 4 in the output frame is output to the output line 1. Since the memory 11 and 12 are accessible at a high speed, the data of each time slot is output to the output line 1 substantially in synchronization with the read of data of one time slot. When the switching process is not performed, or when a certain piece of time slot data is read, the time slot data is immediately output to the output line 1 through the 8-1 selector 14. In addition, the memory 11 has the capacity of storing all time slot data of one frame. When time slot data having a larger time slot number is switched with time slot data having a smaller slot number, the data of the same time slot and the data of the time slot of the frame written one frame before that frame are individually read so that the data can be output to the output line 1 at the timing of the time slot having the corresponding number of the output frame. That is, when the switching process is not performed, the data of the time slot input to the memory 11 is immediately output to the 8-1 selector 14. However, when time slot data in the input frame having a time slot number smaller than a specified time slot in the output frame is inserted into the specified time slot in the switching process, the time slot data having the smaller number of the new frame already written to the memory 11 is read from the memory 11, and inserted into the time slot in the output frame. On the other hand, when data of the time slot in the input frame having a time slot number larger than the time slot number of the data in the output frame to be currently output is output as the output frame data, the data of the time slot having the larger time slot number of the frame being output has not been written to the memory 11 yet. Therefore, the time slot data having the same time slot number in the frame stored one frame before the current frame is read from the memory 11 for switching.

FIG. 9 is a block diagram showing the configuration of the cross-connection according to the fourth embodiment of the present invention designed such that the delay between input data (input frame) and output data (output frame) can be substantially zero.

The switching method is based on the methods shown in FIGS. 2 and 6, and is newly provided with an FF 25, a selector 26, and a phase adjustment unit 27. It is furthermore designed to input a read address to memory 22 as having one address number smaller than the address input to memory 21.

That is, when the time slot data of the time slot number 1 in the input frame is being processed (when the corresponding time slot data in the memory 21 is being written), the channel data information and switching information are read from the memory 22 at the address 0002, and the data of the time slot stored at the address indicated by the channel data information is read from the memory 21. Then, the time slot data read from the memory 21 is defined as an input signal to the FF 25. With the present configuration, the time slot data which is not switched is directly input to the selector 26, and output from the selector 26. The data output from the memory 21 to the FF 25 is time slot data stored at the address indicated by the channel data information input from the memory 22 as described above.

As shown in FIG. 10, the channel data information stored in the memory 22 is stored in the same system as the above described memory 2 according to the first embodiment of the present invention. Therefore, the data of the time slot (channel data) stored in the memory 21 and input to one data input terminal D0 of the FF 25 can be the data of the time slot to be switched or the data not to be switched. As described later, according to the present embodiment, before the data of the time slot of the input frame is input to the data input terminal A of the selector 26, the data of the time slot stored at the address indicated by the channel data information in the memory 21 is input to another input terminal B of the selector 26 through the FF 25. The data input to the input terminal B is either the data of the time slot to be switched with the data of the time slot to be input to the input terminal A, or the data of the input frame stored one input frame before the time slot as the data not to be switched but input to the input terminal A. The data of the time slot input to the input terminal A of the selector 26 is input to the memory 21 at that time, but has not been written to the memory 21.

At each address of the memory 22, the switching information is stored together with the channel data information. The switching information is binary data of 0 or 1, and can be formed by 1 bit. In FIG. 10, the switching information stored at the addresses 0004 and 0100 of the memory 22 respectively indicated by *1 and *2 is '1'. At these addresses, the channel data information having values different from the addresses are stored. On the other hand, at the address where the switching information is '0', the channel data information having the same value as the address is stored. That is, as can be easily known through the explanation according to the first embodiment of the present invention, the switching information indicates the existence or non-existence of the switching process for time slot data. If it is set to 1, then the channel data information set at the storage address indicates the time slot number of the input frame to be switched, and the storage address indicates the time slot number of the output frame to which the time slot data is to be inserted. On the other hand, the switching information of 0 indicates that it is not necessary to switch the time slot data in the input frame having the same time slot number as the channel data information of the same storage address.

The switching information is input to another data input terminal D1 of the FF 25, and input to the selection signal input terminal SEL of the selector 26 in synchronism with the rise of the clock-$\Delta t$ output from the phase adjustment unit 27 described later. When '1' is input to the selection signal input terminal SEL, the selector 26 selects and outputs the data of the time slot input to the input terminal B and read from the memory 21. On the other hand, when '0' is input to the selection signal input terminal SEL, the selector 26 outputs the data input to the input terminal A.

In the above described operation, the switching information is used as a selection signal of the selector 26.

As described above, the address smaller by 1 than the memory 21 is input to the memory 22. Therefore, the channel data information read from the memory 22 and input to the memory 21 as a read address is the time slot number of the time slot at the same position as the data of the time slot input to the data input terminal A of the selector 26, or the time slot number of the time slot data to be switched with the input time slot data. When the channel data information is input to the memory 21 as a read address, the time slot data to be switched with the time slot data input to the data input terminal A of the selector 26 is read and input in advance from the memory 21 to one data input terminal D0 of the FF (flip-flop) 25. That is, at an address indicating the switching information of '1' such as the address 0004 of the memory 22 shown in FIG. 10, channel data information having a value different from the address is stored. According to the channel data information, the time slot data to be switched is read from the memory 21 by the selector 26, and the data is input to the data input terminal D0 of the FF 25. Thus, the time slot data to be cross-connected (switched) is read in advance from the memory 21, and is input to the data input terminal D0 of the FF 25. With the configuration, the delay of the switching process by the operation of the FF 25 and the selector 26 is absorbed. The time slot data of the input frame to the input terminal A of the selector 26 and the data input to the input terminal B of the selector 26 from the FF 25 can be immediately selected and output using the phase adjustment unit 27.

The phase adjustment unit 27 outputs the phase-adjusted clock-$\Delta t$ to the clock input terminal (CLK) of the FF 25.

The clock-$\Delta t$ is generated with the delay time ($\Delta t$) of the switching process by the FF 25 and the selector 26 taken into account, and can be generated by the phase adjustment unit 27 phase-adjusting the clock a2 by $-\Delta t$. Then, by inputting the clock-$\Delta t$ as a clock signal to the FF 25, the above described delay time $\Delta t$ is absorbed. The delay time $\Delta t$ is set by, for example, computing an estimated value using a typical value described on the manual sheet relating to the FF 25 and the selector 26. Otherwise, the delay time $\Delta t$ can be set by actually measuring the time by a measure and by using the measurement result.

According to the fourth embodiment of the present invention, the transmission delay between the input data (input frame) and the output data (output frame) can be reduced to substantially zero with the above described configuration by using the element which permits a high-speed selecting process as an element for the selector 26.

FIGS. 11A through 11F are time charts of the operations according to the fourth embodiment of the present invention.

Described below is the entire operation according to the fourth embodiment of the present invention.

The input data (input frame) shown in FIG. 11A is directly input to the input terminal A of the selector 26, and is directly output from the selector 26 when the data is time slot data not to be cross-connected. Simultaneously, the input data is transmitted to the memory 21 as input data. The count value of the counter 23 for counting the input pulse of the clock a2 is input as a write address of each time slot of each input frame to the memory 21 when the frame synchronization signal (−0.5 CK) b2 whose phase is 0.5 clock faster than the header of each input frame is input. The memory 21 writes the data of each time slot of the input frame at an address which is equal to the counter value as in the above described embodiment.

In addition, a frame synchronization signal (−1.5 CK) b3 whose phase is 1 clock faster than the frame synchronization signal (−0.5 CK) b2 is input to the counter 24. The counter 24 loads the initial value 0001 when the frame synchronization signal (−1.5 CK) b3 is input, and starts counting the input pulses of the clock a2. The count value obtained by the counter 24 is provided for the memory 22 as a read address, and the memory 22 outputs the channel data information and the switching information from the read address. The read information is input to the input terminals D1 of the memory 21 and the FF 25 respectively. When the memory 21 reads the value of the channel data information from the memory 22, and inputs it as an address, it outputs the time slot data of the input data (input frame) stored at the address to the input terminal D0 of the FF 25. At this time, the time slot data output from the memory 21 relates to the time slot after the time slot to be currently output by the selector 26. The switching information input to the input terminal D1 of the FF 25 is output to the selection signal input terminal SEL of the selector 26 when the rise pulse of the clock-Δt shown in FIG. 11E is input.

The clock-Δt input as a clock signal to the FF 25 is a clock generated by the phase adjustment unit 27 as a clock whose phase is Δt faster than the clock a2. The Δt indicates a total delay time of the processes performed by the FF 25 and the selector 26 as described above. At the rise of the pulse of the input clock-Δt, the FF 25 outputs the switching information input from the memory 22, and the time slot data received from the memory 21 respectively to the selection signal input terminal SEL of the selector 26 and the data input terminal B. The selector 26 outputs the time slot data read from the memory 21 and input to the data input terminal B when the selection signal SEL input from the FF 25 is '1', and outputs the time slot data of the input frame input to the input terminal A when the selection signal SEL is '0'. Since the above described selection signal SEL is the switching information stored in the memory 22, the selector 26 selects and outputs the time slot data read from the memory 21 only when the switching information is '1'. When the switching information is '0', the selector 26 selects and outputs the time slot data of the input data, that is, the current input frame.

Since the selector 26 receives the selection signal SEL from the FF 25 at a timing with the above described delay time Δt taken into account, the selector 26 can select and output the time slot data of the input data (input frame) input to the input terminal A and the time slot data read from the memory 21 and input to the input terminal B when, substantially at the time, the time slot data of the input frame is input to the input terminal A. Thus, the transmission delay of the input frame and the output frame can be reduced down substantially to zero.

As described above, when the time slot data of the input data (input frame) is input to the input terminal A of the selector 26, the cross-connecting process (time slot data switching process) can be performed with the transmission delay of almost 0 (refer to FIGS. 11C and 11F).

Figure 12:
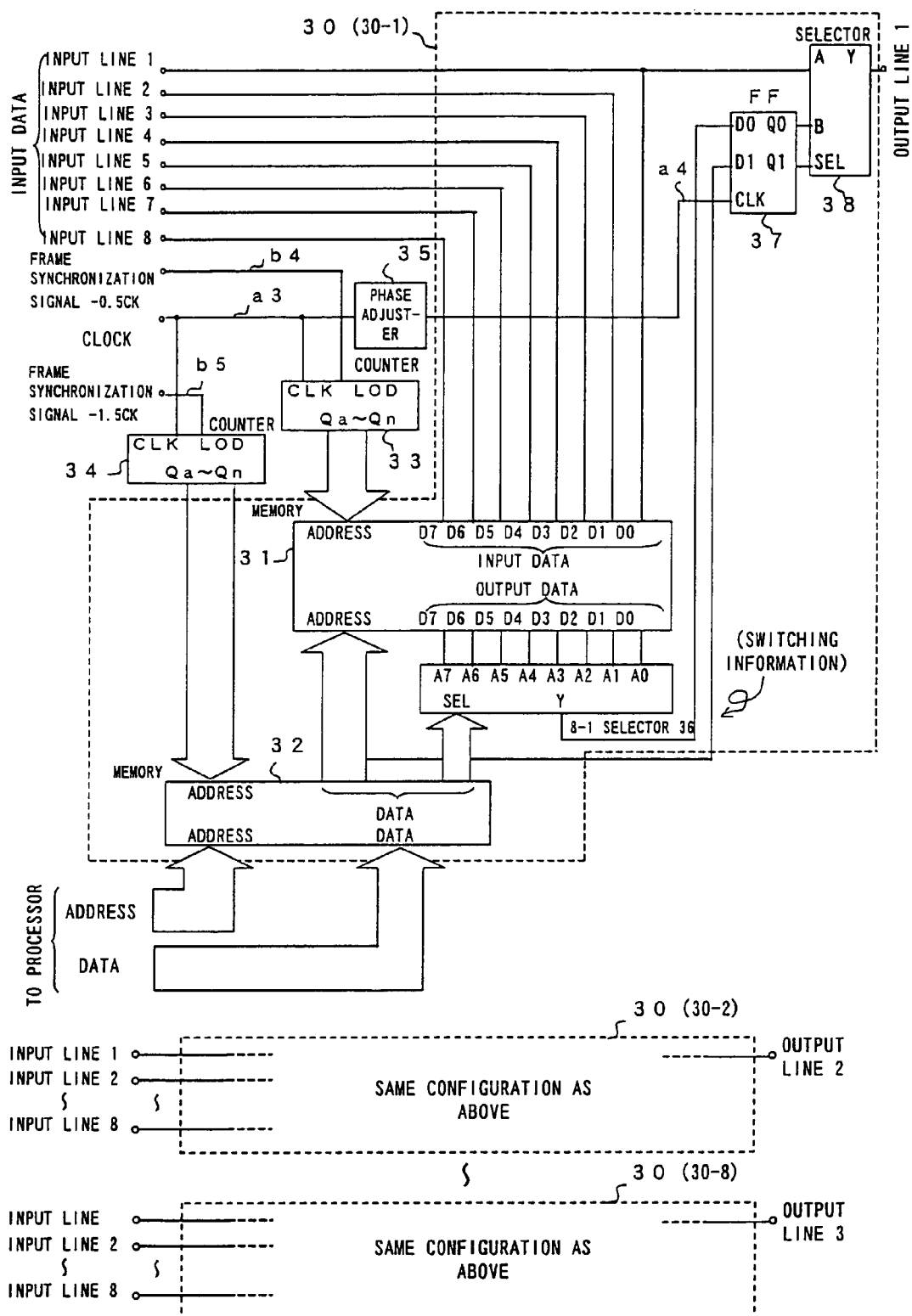
FIG. 12 is a block diagram of the configuration of the cross-connection according to the fifth embodiment of the present invention in which input data and output data are transmitted through eight lines, and time and space switching processes are performed as an extension of the fourth embodiment of the present invention.

FIG. 12 is a block diagram of the configuration of the cross-connection capable of performing a time and spatial switching process between input and output lines in eight lines for input and output data according to the fifth embodiment of the present invention obtained by extending the above described fourth embodiment of the present invention.

When the switching process is realized with the configuration shown in FIG. 12, each component of memory 31, memory 32, an 8-1 selector 36, an FF 37, and a selector 38 is required for each line. Therefore, a total number of units is 5 components×8 lines plus counters 34 and 35, and a phase adjuster 35, thereby considerably reducing the size of the hardware.

According to the present embodiment, since there are eight input lines 1 through 8, eight unit switches 30 (enclosed by broken lines in FIG. 12) are provided to form a cross-connection switch. The unit switch 30 stores the input data from the input lines 1 through 8 in the memory 31. The time slot data storage address of the input frame in the memory 31 is set according to the frame synchronization signal (−0.5 CK) b4 whose phase is 0.5 clock faster than the header of the input frame, and the value obtained by a counter 33 initialized by the clock a3. In addition, as with the case according to the fourth embodiment of the present invention, the counter 34 receives the frame synchronization signal (−1.5 CK) b5 whose phase is one time slot (one clock) faster than the frame synchronization signal (−0.5 CK) b4, and starts reading data from the memory 32 one time slot earlier. FIG. 13 shows an example of the data of the memory 32 written to the memory 32 by the processor (not shown in the drawings). In the example shown in FIG. 13, the address data marked with *1 and *2 indicates the information to be channel-switched between the input and output lines having the same line numbers. The address data marked with *3 and *4 indicates the information to be channel-switched between the input and output lines having different line numbers. The channel data information read from the memory 32 according to the count value (time slot information) from the counter 34 is transmitted to the memory 31, and the line information and the switching information read from the memory 32 are output to an 8-1 selector 36 and an FF 37 respectively. Then, the switching information is transmitted from the FF 37 to a selector 38.

The memory 31 outputs the channel data of each time slot at an address indicated by the channel data information input from the memory 32, and provides it for the 8-1 selector 36 as input data. The 8-1 selector 36 inputs the line information output from the memory 32 as a selection signal SEL, selects the time slot data of the input frame in one line among the time slot data of the input frames in the eight input lines 1 through 8 input to the data input terminals A0 through A7 according to the selection signal SEL, and output the selection result to the input terminal D0 of the FF 37. As in the fourth embodiment of the present invention, input is the clock a4 whose phase is faster by the process delay time Δt of the FF 37 and the selector 38 than the clock a3 generated by the phase adjuster 35. The FF 37 outputs the channel data of the time slot read from the memory 31 and input by the 8-1 selector 36 at the rise of the pulse of the clock a4, and the switching information input from the memory 32 to the selector 38.

The channel data of the time slot output from the FF 37 is input to the B terminal of the selector 38. On the other hand, in a unit switch 30-i (i=1 through 8), the time slot data in the input lines 1 through 8 is input directly to the terminal A of the selector 38. The selector 38 selects and outputs the time slot data input to either the terminal A or the terminal B according to the selection signal SEL which is the switching information read from the memory 32 and input from the FF 37 as time slot data of an output frame to be transmitted to the output line i.

The input line 1 is connected directly to the input terminal A of the selector 38 in the unit switch 30-1 because the unit switch 30-1 is a switch for cross-connecting the channel data of the time slot of a frame output to the output line 1. Similarly, in the case of the unit switches 30-2 through 30-8 for cross-connecting the channel data of the time slots of frames output to the output liens 2 through 8, the channel data of the time slots of the frame inputs respectively from the input lines 2 through 8 is input directly to a selector (not shown in the drawings, but is hereinafter referred to as the selector 38) similar to the selector 38. The selector 38 provided in each unit switch 30-i (i=1 through 8) either outputs the time slot data of the frame input through the input line i, or switches in time and space the channel data of each time slot of the frame input through the input lines 1 through 8. The process of switching channel data between an input line and an output line having different line numbers is performed by the 8-1 selector 36. The 8-1 selector 36 performs the switching process according to the line information input from the memory 32 as in the third embodiment of the present invention. In addition, since the phase adjuster 35 and the 8-1 selector 36 are provided according to the present embodiment, the time and spatial switching can be realized in time of substantially zero as in the fourth embodiment of the present invention.

Furthermore, according to the present embodiment, the number of accommodated lines is eight, but it can be flexibly variable only by increasing or decreasing the number of the unit switches 30.

Figure 14:
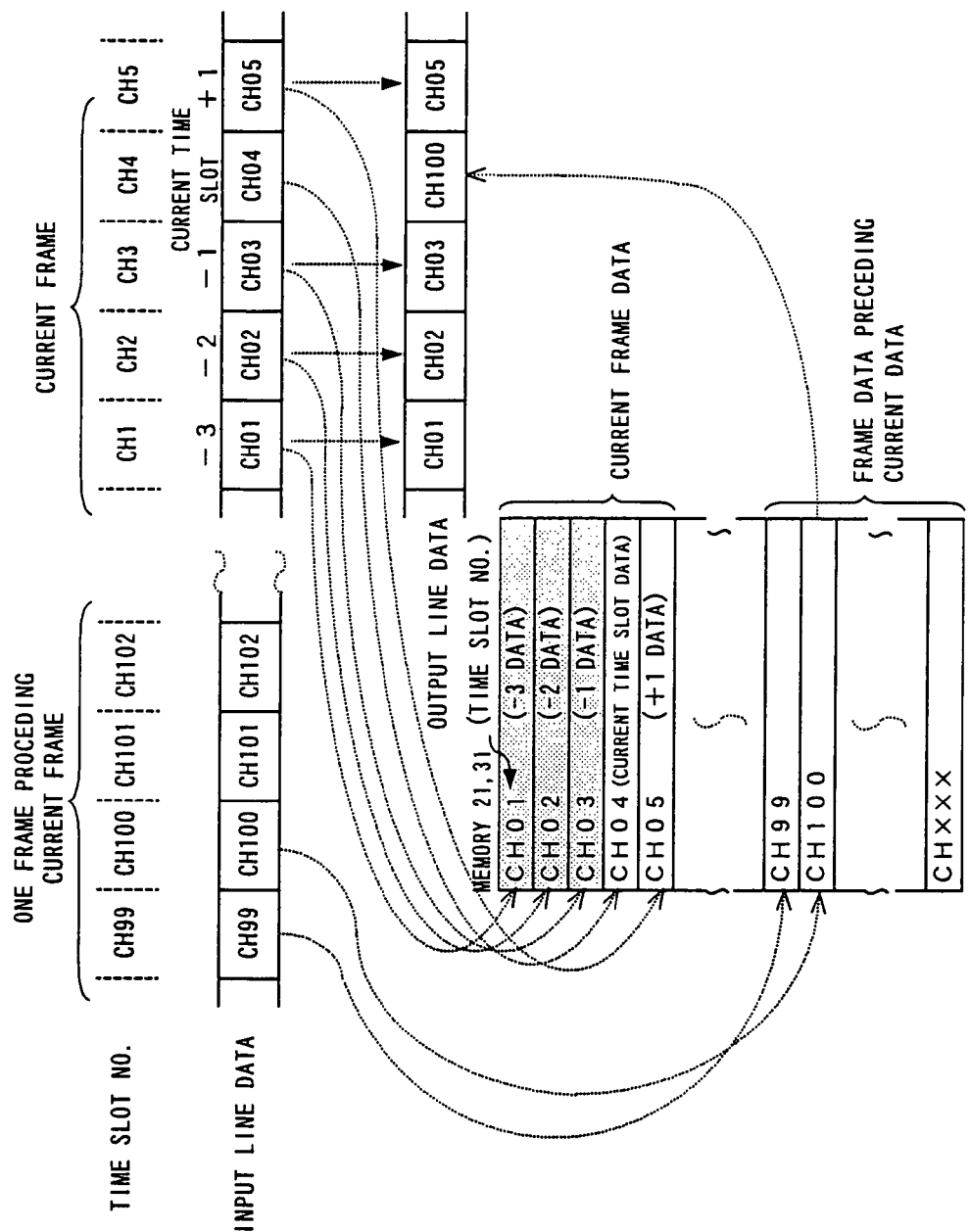
FIG. 14 shows the operations according to the fourth and fifth embodiments of the present invention.

FIG. 14 shows the concept of the operations according to the fourth and fifth embodiments with the above described configuration.

As shown in FIG. 14, the memory 21 or 31 sequentially stores the frame data transmitted from an input line for each time slot. Each time a new frame is input, the time slot data in one frame before the current frame is overwritten. As described above, the output frame data of a time slot having a number smaller than the time slot being processed as an output frame is stored in the memory 21 or 31 as in the third embodiment of the present invention. Therefore, the data of the current frame can be inserted into a time slot having a larger number than the present frame by reading the data of a time slot having the smaller number from the memory 21 or 31. On the other hand, when the data of a time slot is inserted into a time slot having a smaller number, the time slot data of one frame before the current frame is used. In the memory 21 or 31, the data of the time slot of the current frame has not been written yet, and the data of one frame before the current frame is stored for the time slot.

FIG. 14 shows the case in which the process of outputting the data of a time slot of the channel 4 (time slot number 4). Between the input frame and the output frame, when the data of the time slot 100 of an input frame is switched with the data of the time slot 4, the time slot data of the time slot number 100 is read as the data of one frame before the current frame, thereby performing the switching process.

As described above, according to the present invention, unlike the conventional technology, it is not necessary to convert a serial signal of an input frame into a parallel signal (example: octet unit). Therefore, the hardware can be considerably reduced in size. Since the transmission delay of signals generated in the conventional conversion process from a serial signal to a parallel signal can be removed, the switching process can be performed at a high speed.

Therefore, an expected quick line process can be performed according to the present invention, and the reduction in hardware size, number of necessary parts, number of signal lines, etc. requires a small power consumption, and realizes a desired small system.

What is claimed is:

1. A cross-connection switch comprising:
   first memory means for storing data indicating switching information of a time slot at an address to which time slot information is assigned;
   second memory means for storing data of each time slot of an input frame in time slot units, inputting data stored in said first memory means, and outputting the data stored at the address specified by the data as time slot data of an output frame;
   counter means for counting a number of input time slots of an input frame in synchronization with the input frame, and outputting the count value as a read address and a write address respectively to said first memory means and said second memory means; and
   selector means for switching data of a time slot directly input from an input line with data of a time slot read from said second memory means and outputting a switching result, wherein
   said selector means is controlled to output time slot information not to be switched as time slot data of an output frame without performing a process on the information by inputting information read from said first memory means as a selector signal to said selector means, and to output time slot data read from said second memory means as time slot data of an output frame to be switched.

2. The switch according to claim 1, wherein
   when a multiplexed line signal having an input frame of n bits per channel is processed, a time slot number of each bit of an n-bit channel is assigned to addresses of said first memory means, and data indicating switching information about a time slot of each piece of bit data is entered at each address of said second memory means.

3. The switch according to claim 1, wherein
   when a plurality of lines are accommodated by said cross-connection switch, any line of the plurality of lines is selected for a switching process by entering switching information about time order of data of a time slot and switching information data between lines at each address of said first memory means.

4. The switch according to claim 1, wherein
   information of a current input time slot is written to said second memory means, data to be used in processing one time slot before the current input time slot is read from said first memory means, a read address is output from said first memory means to said second memory means, and time slot data used in processing the one time slot before the current input time slot is read from said second memory means.

5. The switch according to claim 1, further comprising flipflop means for holding data of a time slot read from said second memory means, wherein a timing of a switching process of said selector means is adjusted by inputting to said flipflop means a second clock generated by adjusting a phase of a first clock synchronous with a time slot of an input frame by inputting to said flipflop means time slot data used as data of one time slot earlier than a current point from said second memory means.

6. The switch according to claim 5, further comprising phase adjustment means for inputting the first clock, and generating the second clock whose phase is faster than the first clock by a predetermined time with an output delay of said flipflop means and a switching delay of said selector means taken into account, wherein said output delay and said switching delay are absorbed by inputting the second clock generated by said phase adjustment means as a clock signal to said flipflop means.

7. A cross-connection switch comprising:

a counter counting a number of input time slots of an input frame in synchronization with the input frame, and outputting the count value as a read address and a write address;

a first memory storing switching information data for a time slot, said data stored corresponding to addresses to which time slot information is assigned and outputting said switching information data according to the read address from said counter;

a second memory storing data of each time slot of an input frame in time slot units according to the write address from said counter and outputting said stored data of each time slot as read utilizing the switching information data from said first memory as a read address, thereby outputting time slot data of an output frame; and selector means for switching data of a time slot directly input from an input line with data of a time slot read from said second memory means and outputting a switching result, wherein said selector means is controlled to output time slot information not to be switched as time slot data of an output frame without performing a process on the information by inputting information read from said first memory means as a selector signal to said selector means, and to output time slot data read from said second memory means as time slot data of an output frame to be switched.

* * * * *